United States Patent Office 3,541,884
Patented Nov. 24, 1970

3,541,884
CONNECTING JOINT FOR TURNING OFF TOE CLIPS, ESPECIALLY FOR COLLAPSIBLE BICYCLES
László Nógrádi, Budapest, Hungary, assignor to Csepeli Kerekpar es Varrogepgyar, Budapest, Hungary
Filed Mar. 14, 1969, Ser. No. 807,222
Claims priority, application Hungary, Mar. 19, 1968, NO–124
Int. Cl. G05g 1/14
U.S. Cl. 74—594.7    3 Claims

ABSTRACT OF THE DISCLOSURE

The invention provides a simple and very reliable mechanism for turning the toe clips of collapsible bicycles in order to diminish their packing volume. For this purpose an axially displaceable pin is provided in the device, this pin being pushed in its connecting position by a spring and being adapted to be moved in the disengaging position by a push button.

---

As is known, bicycle pedals are generally rigidly connected to the crank rods by means of threads, protruding thus in an angle of 90° from the plane of the bicycle. Such protruding pedals are especially disadvantageous in case of collapsible bicycles since it increases the packing volume and packing dimensions, thereby rendering packing and transport more expensive.

In order to eliminate the above drawbacks, different solutions have been proposed the disadvantage of which is, however, that specially developed crank rods are required for turning off the toe clips whereby the field of application is considerably limited and manufacture becomes more expensive.

A further drawback of the known constructions consists in that for turning off the toe clip a nut, a pin or a screw must be released by hand or by a separate wrench then the pedal released in this way must be turned off and fastened again by means of the screw, pin or nut. Thus the turning-off operation is rendered more difficult and makes out a considerable part of the folding time of the bicycle. Moreover, the hands of the person folding the bicycle become soiled when releasing and refastening the nut generally releasable by hand.

The invention aims at the elimination of the above drawbacks by a solution in which the turning-off of the pedal may be carried out by means of a connecting joint to be built in separately. The invention is based on the recognition that the fastening pin provided with a conic surface may be released against a spring by means of a pushbutton and the toe clip being turned off, the spring will automatically fasten the toe clip by operating a wedging pin. Thus, the hands of the operator will not become soiled and the toe clip can be quickly turned off. A further advantage consists in that instead of a special crank rod, the conventional crank rod and pedal may be used, thus rendering possible the use of the connecting joint according to the invention also for bicycles already in use on the market. Finally, it should be mentioned that the connecting joint according to the invention completely fixes the toe clip in both positions as well as in any position of driving with identical safety.

Two embodiments of the connecting joint according to the invention are possible and the advantage of both types is that they may be used for any bicycle crank rod since the connecting thread of the joint is the internationally employed bicycle thread. In one embodiment the crank rods and toe clips applied in the bicycles can be invariably used, whereas in the other embodiment the conventional crank rod of the bicycle can be used without modification but the shaft of the toe clip must be constructed in accordance with the invention.

The invention will be described in more detail with reference to the attached drawing in connection with two embodiments by way of example.

Figure 1:
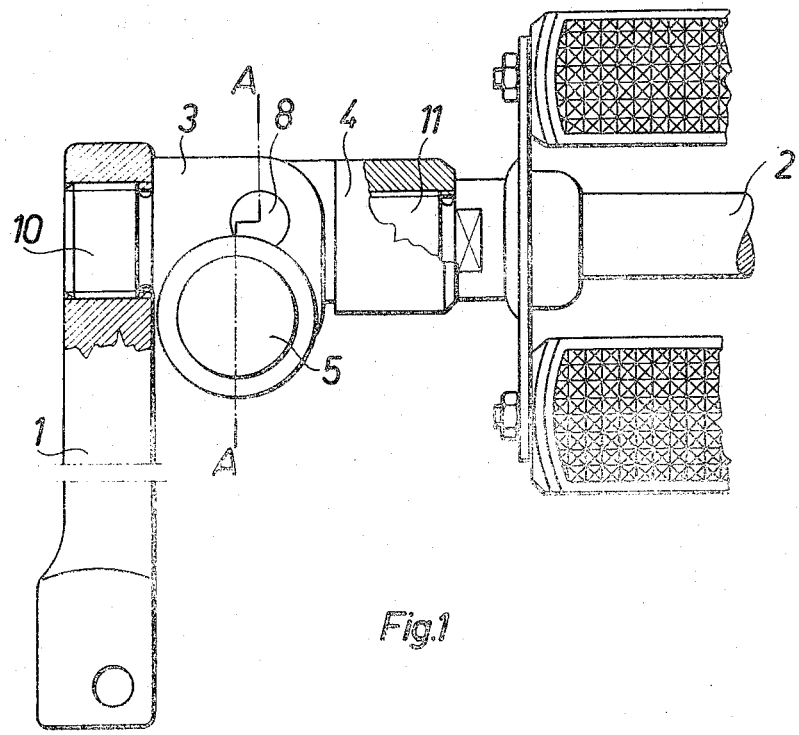
FIG. 1 shows the first embodiment partly in section, showing the crank rod and the toe clip.
Figure 2:
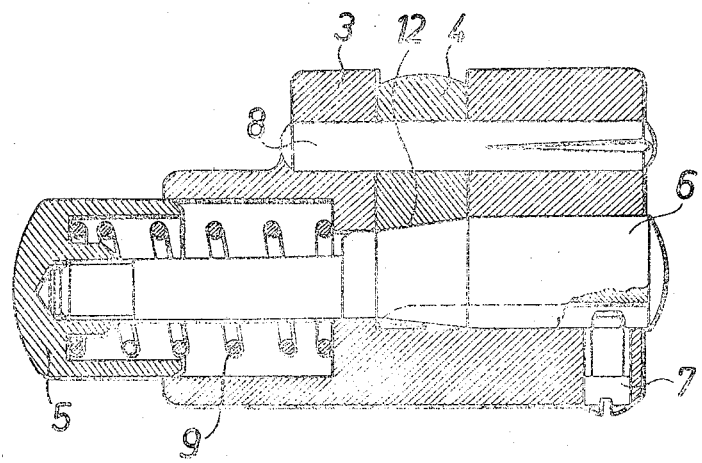
FIG. 2 is a section through FIGS. 1 and 3 along the line A—A.

The connecting joint shown in FIG. 1 is connected to a crank rod 1 by its threaded part 10 and to the toe clip 2 by its threaded part 11. The crank rod 1 and toe clip 2 may be of the types conventionally used in any type of bicycle. If the threaded parts 10 and 11 of the connecting joint are provided with left-hand threading, the crank rod and the toe clip will be the left-hand ones of the bicycle.

If the threaded parts 10 and 11 of the connecting joint are provided with right-hand threading, the crank rod 1 and the toe clip 2 will be the right-hand ones of the bicycle, although the turning-off of the right hand toe clip is generally not necessary since it gets into the inside of the collapsible bicycle frame.

The toe clip 2 folded in a joint head 4 is fastened by the conic surface 12 of an eccentric pin 6 guided in the joint body 3 by means of a spring 9. The turning-off of the eccentric pin is prevented by a pivoted screw 7. The toe clip may be turned off when the pressure nut 5 guided in the joint body 3 is pressed against the spring 9, whereas the conic surface 12 releases i.e. displaces itself from the fastening position, moving to the right according to the drawing, thus rendering possible the turning-off of the joint head 4 around a slotted dowel 8. Thus, the toe clip is turned off and in this position the spring 9 releasing the pressure nut 5 fixes the toe clip 2 through the joint head 4 by means of the eccentric pin 6.

The re-establishment of the ready-for-driving position occurs in the same way.

Figure 3:
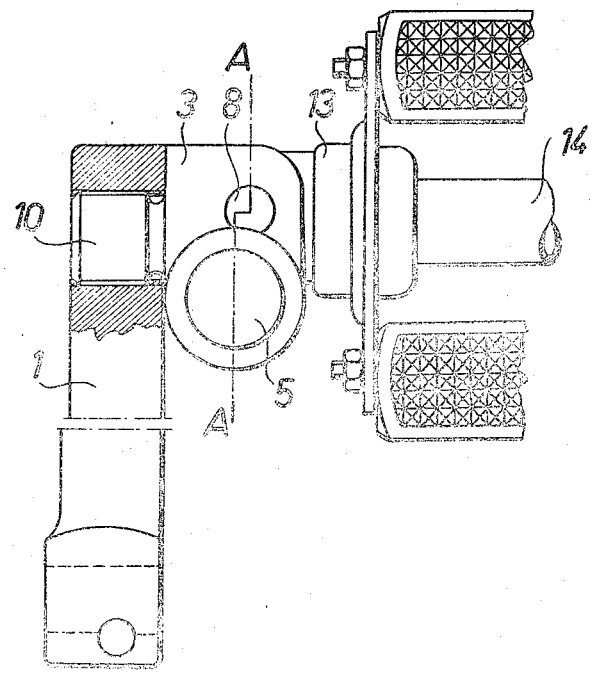
FIG. 3 represents the second embodiment, partly in section.

The threaded part 10 of the connecting joint shown in FIG. 3 is connected to the crank rod 1 in the way shown in FIG. 1 and constitutes a unit with the toe clip 14 mounted onto the pedal shaft 13. The crank rod may be that used for any bicycle. The toe clip 14 may be that used for any bicycle in which the shaft 13 is built in, but this pedal shaft differs from the generally known types in that instead of the connecting threaded part it has a head suitably developed to the joint. The operation of the connecting joint and the folding of the toe clip respectively is the same as described above.

It may be seen from what has been described above that the construction according to the invention is simply manageable; both in use and in collapsed position its fastening is highly reliable and may be more generally used than any of the known constructions.

What I claim is:

1. In a connecting joint for turning off the toe clip of collapsible bicycles, a crank rod (1) for driving the said bicycle, a toe clip (2) for the foot of the driver, a joint body (3) connecting the said crank rod with the said toe clip, an eccentric pin (6) guided for axial movement in the said joint body but hindered against rotation, a conical surface (12) on the said pin, a corresponding inner fastening surface on the joint body, the said conical surface being adapted to bear against this fastening surface, a spring (9) tending to push the said pin into its connecting position in which the conical surface bears on the said fastening surface, and a push button (5) on which the said spring bears, this push button being adapted to move the said pin axially into its disengaged position.

2. Connecting joint according to claim 1, in which one end of a joint head (4) is connected to the said joint body whereas its other end is provided with a nut thread corresponding to the standard thread of the toe clips.

3. Connecting joint according to claim 1, in which the toe clip is directly connected to the joint body.

References Cited
UNITED STATES PATENTS

| | | | |
|---|---|---|---|
| 3,015,498 | 1/1962 | Tanaka et al. | 74—594.7 XR |
| 3,422,701 | 1/1969 | Boisis | 74—594.7 |

FRED C. MATTERN, JR., Primary Examiner

F. D. SHOEMAKER, Assistant Examiner